United States Patent Office

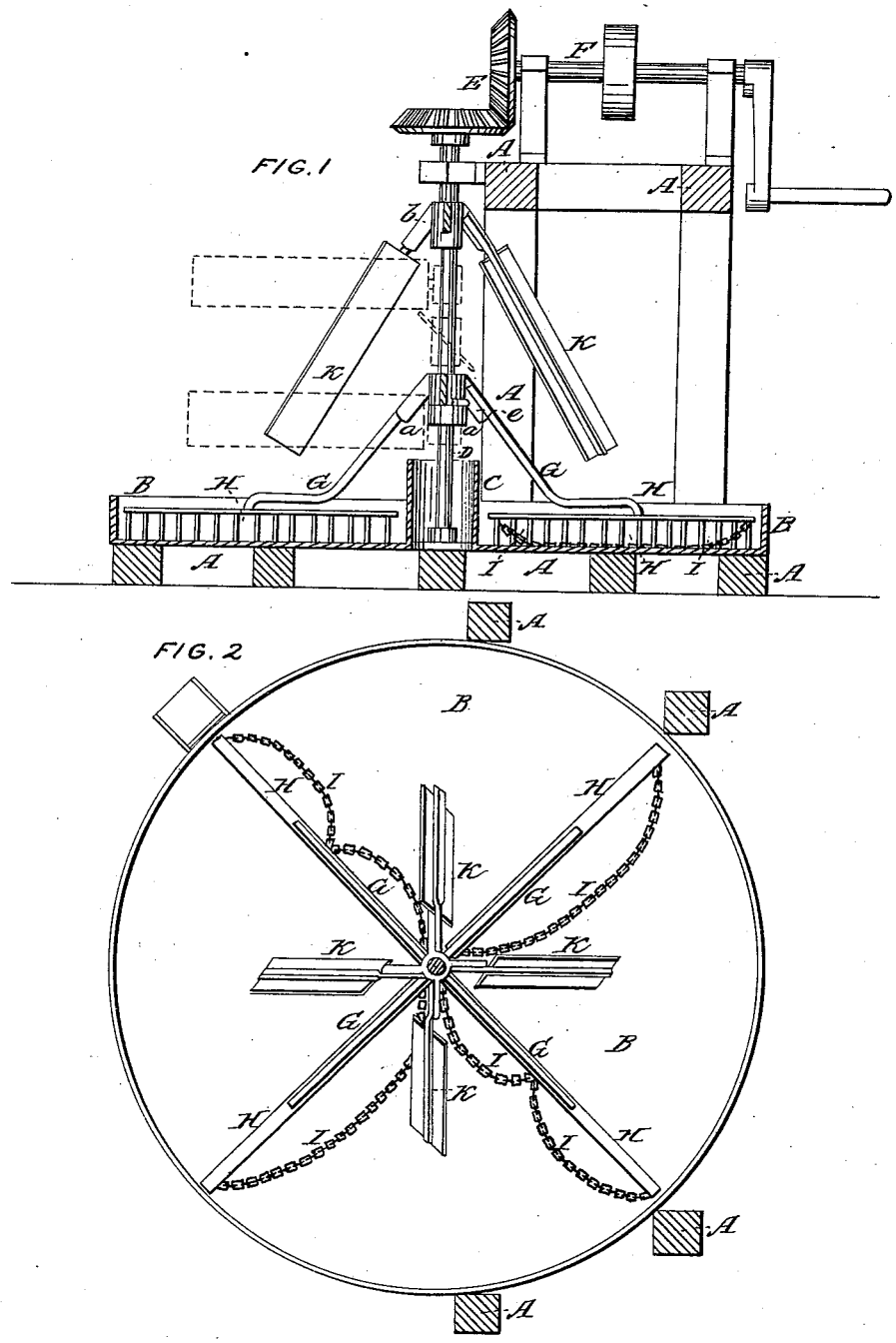

C. WISE AND B. LOEFFLER, OF NEW YORK, N. Y.

Letters Patent No. 64,614, dated May 7, 1867.

---

IMPROVED BEER AND MASH COOLER.

---

*The Schedule referred to in these Letters Patent and making part of the same.*

---

TO ALL WHOM IT MAY CONCERN:

Be it known that we, C. WISE and B. LOEFFLER, both of the city, county, and State of New York, have invented a new and improved Beer and Mash Cooler; and we do hereby declare that the following is a full, clear, and exact description thereof, which will enable others skilled in the art to make and use the same, reference being had to the accompanying drawings, forming part of this specification, in which—

Figure 1 represents a vertical sectional view of our improved cooler; and

Figure 2 is a horizontal sectional view of the same.

Similar letters of reference indicate corresponding parts.

This invention relates to an apparatus for cooling the mash in the manufacture of beer, but may be used with advantage in all kinds of distilleries, and for other purposes, such as cooling the worts, &c. It consists in the use of a circular horizontal vessel into which the heated mash is poured. In the centre of the vessel a vertical shaft is arranged, which receives rotary motion from a belt or otherwise, and on which a number of wings are attached in such a manner that by the same the vapors which ascend from the liquor are thrown aside and fresh air brought into their place, so as to rapidly cool the mash or liquor in the vessel. The mash or liquor itself is kept in motion by a set of stirrers arranged on the revolving shaft, and by chains attached thereto, which prevent the settling of any residue and help to rapidly cool the mash or liquor. The fans, as well as the stirrers, are arranged adjustable on the aforesaid shaft.

A represents a frame, made of wood or other suitable material, and arranged so as to support the horizontal circular pan B, which is made of sheet metal or other suitable material. In the centre of the pan is arranged an upright tube, C, which surrounds a vertical shaft, D, that has its bearings in the frame A, and revolves, receiving motion from a gear-wheel, E, on a horizontal shaft, F, or from any other suitable device. The tube C prevents the liquor or mash in the pan from coming in contact with the shaft D. On the shaft D slide two or more sleeves, $a$ and $b$, which are held in place by means of set-screws $e$ $e$, and are adjustable on the shaft. On the lower sleeve $a$ are secured four (more or less) arms G, to the lower ends of which are secured stirrers H, which are horizontal bars provided with teeth, as shown in the drawings. As the shaft revolves these stirrers are passed through the liquor or mash in the pan and keep it in motion. To the stirrers H may be attached chains I, which prevent the settling of any residue in the pan. To the sleeve $b$ are secured four (more or less) wings K, in such a manner that the same will most effectually remove the vapors from and conduct fresh air to the surface of the liquor or mash. These wings may be secured to the sleeve $b$ in an inclined position, or they may be arranged horizontally, as shown in red lines in fig. 1; or two rows of such wings may be arranged on two separate sleeves, or on one sleeve, as may be desired. It is very important that the fan should be adjustable on the shaft D, so that the best position for most rapidly cooling the liquor or mash in the pan may by practice be ascertained.

Having thus described our invention, what we claim as new, and desire to secure by Letters Patent, is—

A cooler for mash, beer, and other liquids, consisting of a circular stationary pan, B, in combination with a revolving shaft, D, to which the fan or fans K and stirrers H are adjustably secured, substantially as and for the purpose herein shown and described.

C. WISE,
B. LOEFFLER.

Witnesses:
  WM. F. McNAMARA,
  ALEX. F. ROBERTS.